United States Patent [19]
Bryars et al.

[11] Patent Number: 6,144,498
[45] Date of Patent: Nov. 7, 2000

[54] COLOR SEPARATION PRISM ASSEMBLY AND METHOD FOR MAKING SAME

[75] Inventors: Brett J. Bryars; Blain J. Hendrix, both of Santa Rosa, Calif.

[73] Assignee: Optical Coating Laboratory, Inc., Santa Rosa, Calif.

[21] Appl. No.: 09/321,363

[22] Filed: May 27, 1999

Related U.S. Application Data

[60] Provisional application No. 60/088,922, Jun. 11, 1998.

[51] Int. Cl.⁷ ..................................... G02B 27/14
[52] U.S. Cl. ........................... 359/634; 359/638; 348/338
[58] Field of Search ..................................... 348/338, 337; 359/634, 637, 638, 833

[56] References Cited

U.S. PATENT DOCUMENTS

| | | | |
|---|---|---|---|
| 2,392,978 | 1/1946 | Dimmick | 88/1 |
| 3,659,918 | 5/1972 | Tan | 350/166 |
| 4,009,941 | 3/1977 | Verdijk et al. | 350/173 |
| 4,084,180 | 4/1978 | Stoffels et al. | 358/55 |
| 4,913,528 | 4/1990 | Hasegawa | 350/286 |
| 5,014,121 | 5/1991 | Hasegawa et al. | 358/55 |
| 5,327,289 | 7/1994 | Watanabe et al. | 359/634 |
| 5,418,769 | 5/1995 | Inoue | 369/112 |
| 5,621,486 | 4/1997 | Doany et al. | 348/756 |
| 5,644,432 | 7/1997 | Doany | 359/634 |
| 5,658,060 | 8/1997 | Dove | 353/33 |
| 5,671,993 | 9/1997 | Shikama | 353/77 |
| 5,900,984 | 5/1999 | Yamanaka et al. | 359/638 |

FOREIGN PATENT DOCUMENTS

| | | |
|---|---|---|
| 0837351 A2 | 4/1998 | European Pat. Off. . |
| 3-150523 | 6/1991 | Japan . |
| 9-211209 | 8/1997 | Japan . |

OTHER PUBLICATIONS

Keating, Michael P., "*Geometric, Physical & Visual Optics,*" 1988, Butterworths, Boston, MA, pp. 139–142.

*Primary Examiner*—Scott J. Sugarman
*Attorney, Agent, or Firm*—Workman, Nydegger & Seeley

[57] ABSTRACT

A color separation device useful in information display systems is assembled from three prisms in an arrangement that provides for air equivalent thickness adjustment for each color. The air equivalent thickness adjustment provides for the correction of deviations in any of the three prisms, as well as providing a method to correct for the chromatic aberration arising from other optical elements in the information display system. The color separation device improves image quality and provides opportunities to lower the display system cost by using low tolerance components and/or plastic optical components normally having a high chromatic aberration.

35 Claims, 8 Drawing Sheets

COLOR SEPARATION PRISM ASSEMBLY AND METHOD FOR MAKING SAME

This application claims the benefit of priority to U.S. Provisional Application No. 60/088,922, filed on Jun. 11, 1998, the disclosure of which is herein incorporated by reference.

BACKGROUND OF THE INVENTION

1. The Field of the Invention

The present invention relates generally to information displays that utilize color separation prisms. More particularly, the invention relates to a color separation prism assembly and a method for assembling the prism.

2. Present State of the Art

An effective way to achieve precise color separation for many optical applications is by use of dichroic optical interference filters, which are designed to have a sharp transition between transmission and reflection in a precise region of the visible spectrum. Dichroic filters have been used with various types of prisms, along with other optical components. When dichroic filters are utilized on the faces of prisms or prism assemblies, light corresponding to discrete spectral ranges can be re-directed or recombined.

The combination of dichroic filters and prisms is commonly used in color imaging and display systems as a way to separate colors or combine the primary colors into the final image. A compact optical element which accomplishes this purpose is known as a Philips prism. The Philips prism assembly is commonly known, and various uses thereof are described in U.S. Pat. Nos. 2,392,978, 3,659,918, 4,009,941, 4,084,180, and 4,913,528, the disclosures of which are incorporated herein by reference.

Briefly, a Philips prism assembly comprises two triangular prisms and one rectangular prism cemented into an assembly. The two triangular prism elements have an air gap between them. The rectangular prism element is optically cemented on a face thereof to a face of one of the triangular prisms, opposite the air gap bonded face. Dichroic filter coatings are on the faces of the two triangular prisms. When used in an information display system, each prism element has an associated image modulating device aligned with an external facet of each prism element. The image modulating device is usually a cathode ray tube or liquid crystal light valve. The source of light used to form the image can come from the image modulating device, as in the case of a cathode ray tube. Liquid crystal light valves (LCLV) or liquid crystal display (LCD) cells can be used with a Philips prism in a transmission mode using back lit illumination through the LCD cell into the prism.

The LCD cells are more efficient in the reflection mode, as used, for example, in image projection systems disclosed in U.S. Pat. Nos. 5,621,486 and 5,644,432, the disclosures of which are incorporated herein by reference. In this mode, a single illumination source provides white light. A polarizing beam splitter is used to direct one polarization of white light into the facet of the first prism element in the assembly. The prism splits the light into three color channels, typically red, blue, and green, which are transmitted through an exit facet of each prism element to the associated LCD. Each color channel is retroreflected back into the prism by the LCD whereby the polarization of the reflected light is spatially modulated via activation of each particular pixel comprising the LCD image plane. The light reflected from the three LCDs is recombined within the prism assembly and exits the prism through the entrance facet. A color image is formed when the retroreflected spatially modulated light enters the polarizing beam splitter, whereby light corresponding to image pixels that caused a 90 degree change in polarization is now transmitted through the polarizing beam splitter, and separated from the unmodulated light. The polarizing beam splitter acts as both a polarizer for light entering the Philips prism and an analyzer for the light exiting the prism to form a spatially modulated image. This image is then projected by an additional lens assembly onto a viewing screen.

Philips prisms are relatively compact optical assemblies for color separation. The angle of incidence for light reflected off the various dichroic coatings is less than 30 degrees, which is not the case for most other color separating prism assemblies. This can be significant, as the performance of dichroic coatings becomes increasingly angle sensitive as the angle of incidence increases.

Prism components and optical coatings are expensive to manufacture. The individual prism elements must be made within sufficiently high tolerances to obtain precise overlap of the recombined images formed at each of the liquid crystal light valves. The optical coatings are also expensive. Antireflection coatings are commonly used on the entrance face of each individual prism, and frequently on any exit face which is not cemented, or optically bonded, to another prism element. In a Philips prism, two of the three prism elements have dichroic coatings applied to their surfaces. Any errors made in prism assembly, whether they result from the assembly method or the tolerance of the individual prism elements, results in defective parts and lost value of coatings and components.

SUMMARY AND OBJECTS OF THE INVENTION

A primary object of the invention is to reduce the cost of prism assemblies used in image display systems, particularly those using Philips prisms. This object is accomplished by an assembly method which corrects for errors in individual prism elements.

Another object of the invention is to provide a color separation prism assembly that corrects for the chromatic aberration of the optical system components.

A further object of the invention is to provide low cost manufacturing methods for the attachment of additional optical components to color separation prisms.

An additional object of the invention is to provide for direct attachment of image modulation devices to the exit facets of a Philips prism.

Another object of the invention is to provide for direct attachment of field lenses to the exit facets of a Philips prism.

To achieve the foregoing objects, and in accordance with the invention as embodied and broadly described herein, a color separation device useful in optical imaging display systems is assembled from three prism elements in an arrangement that provides for air equivalent thickness adjustment for each color. The air equivalent thickness adjustment provides for the correction of deviations in any of the three prisms, as well as providing a method to correct for the chromatic aberration arising from other optical elements in the display system.

The individual prism elements of the color separation device are fabricated in a manner and sequence which results in independent optical path length correction for each color channel, which are defined by the optical coatings within the prism assembly. The air equivalent thickness within the entire prism assembly for any color channel is varied to meet a predetermined difference, which may be zero. The air equivalent thickness is the physical path length divided by the refractive index. The air equivalent thickness for each color channel is a function of the geometric dimensions of the prism element which separates that color channel and the geometric dimensions of the preceding prism elements within the optical path, along with the refractive index of the prism assembly components.

The physical path within each prism element is varied by adjusting the entrance position of the incident light rays a predictable amount, based on geometric and optical principles. The adjustment is made by assembling the second and third prisms to selectively offset their nominal optical path entrance point from the optical path exit point of the preceding prism. This is accomplished by pre-characterizing each prism element and calculating the distance each prism is translated along its planar interface with the preceding prism to obtain the desired air equivalent thickness.

The color separation device of the invention improves image quality and provides opportunities to lower the display system cost by using low tolerance components and/or plastic optical components normally having a high chromatic aberration.

The method of the invention provides for manufacturing achromatic prisms. Alternatively, the method of the invention provides for manufacturing prisms having a predetermined amount of chromatic aberration to correct for other components in an optical system. The method of assembly corrects for errors in prism dimensions arising from manufacturing steps, providing a prism assembly sufficiently characterized to align and directly attach additional optical components to the prism assembly.

Other features and advantages of the present invention will become apparent from the following description, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting in scope, the invention will be described and explained with additional specificity and detail through the use of the accompanying drawings in which.

DETAILED DESCRIPTION OF THE INVENTION

Figure 1:
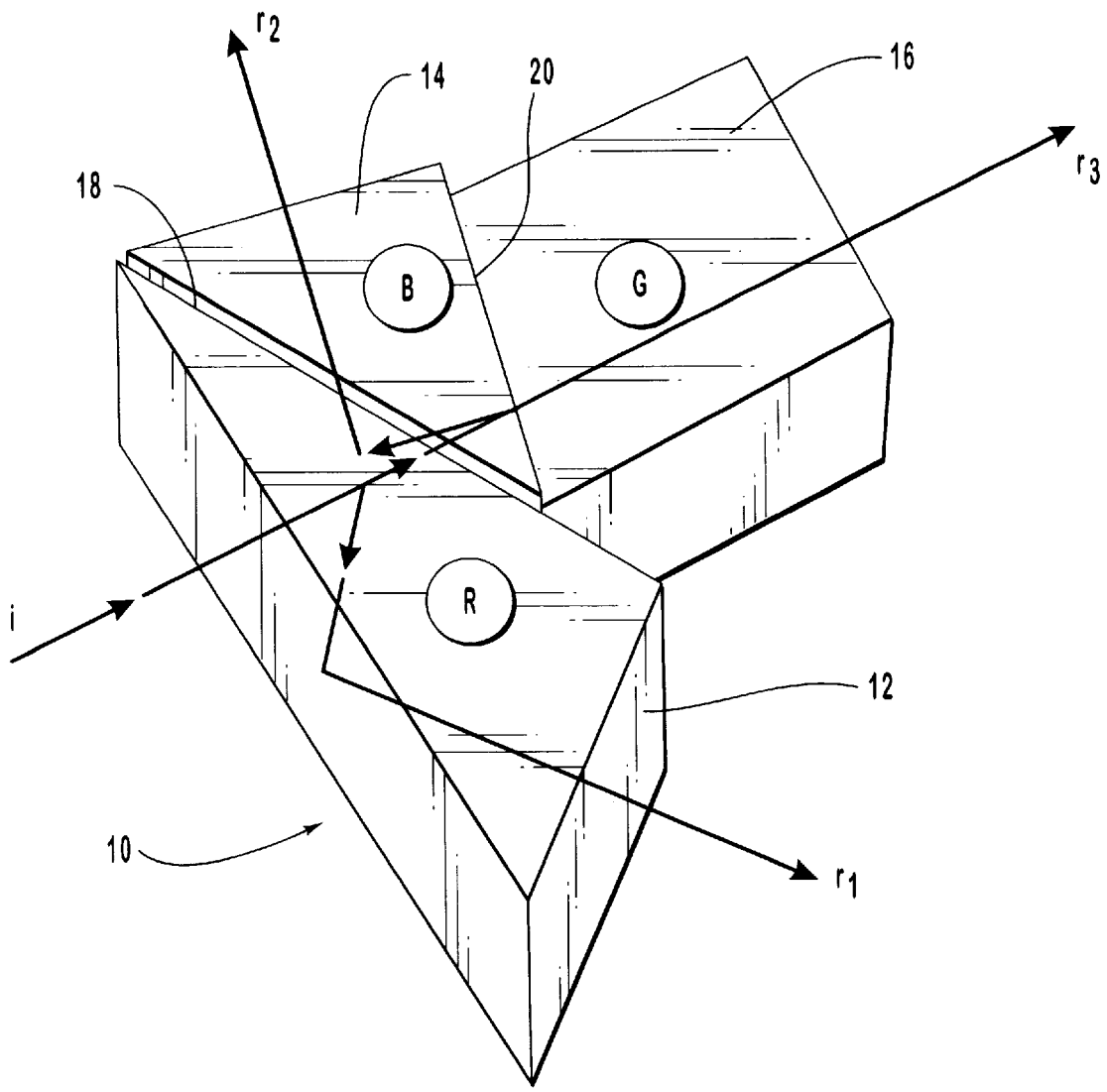
FIG. 1 is a perspective view of a conventional Philips prism assembly.

The present invention is directed to a color separation device and a method for assembling the device. The color separation device is assembled from three prisms in an arrangement that provides for air equivalent thickness correction for each color. The air equivalent thickness adjustment provides for the correction of deviations in any of the three prisms, as well as providing a method to correct the chromatic aberration arising from other optical elements in an information display system.

Image quality is improved by the prism assembly of the invention used in information display systems. The method of the invention provides for opportunities to lower the optical system cost by using low tolerance components and/or plastic optical components such as plastic prism elements which normally have a high chromatic aberration.

Referring to the drawings, like structures are provided with like reference designations. While a Philips prism assembly is used to illustrate the embodiments of the invention, the teachings of the invention are equally applicable to related prism assemblies.

FIG. 1 shows a perspective view of a conventional Philips prism assembly 10. The prism assembly 10 includes a first triangular prism 12 and a second triangular prism 14, with a third prism 16 having at least four sides. The triangular prisms 12 and 14 are positioned with respect to each other to provide an air gap 18 at their interface. The second triangular prism 14 and third prism 16 are optically cemented at an interface 20 of these prisms. As indicated in FIG. 1, prism 12 is configured to separate red light (R), prism 14 is configured to separate blue light (B), and prism 16 is configured to receive green light (G).

The light ray paths through prism assembly 10 are shown in FIG. 1. An incident ray i passes into prism 12, with a portion thereof (e.g. red light) internally reflected and emerging from prism 12 as $r_1$. The remaining portion of the incident light passes into prism 14, with a portion thereof (e.g., blue light) internally reflected and emerging from prism 14 as $r_2$. The remaining portion of the incident ray (e.g., green light) emerges from prism 16 as $r_3$.

Figure 2:
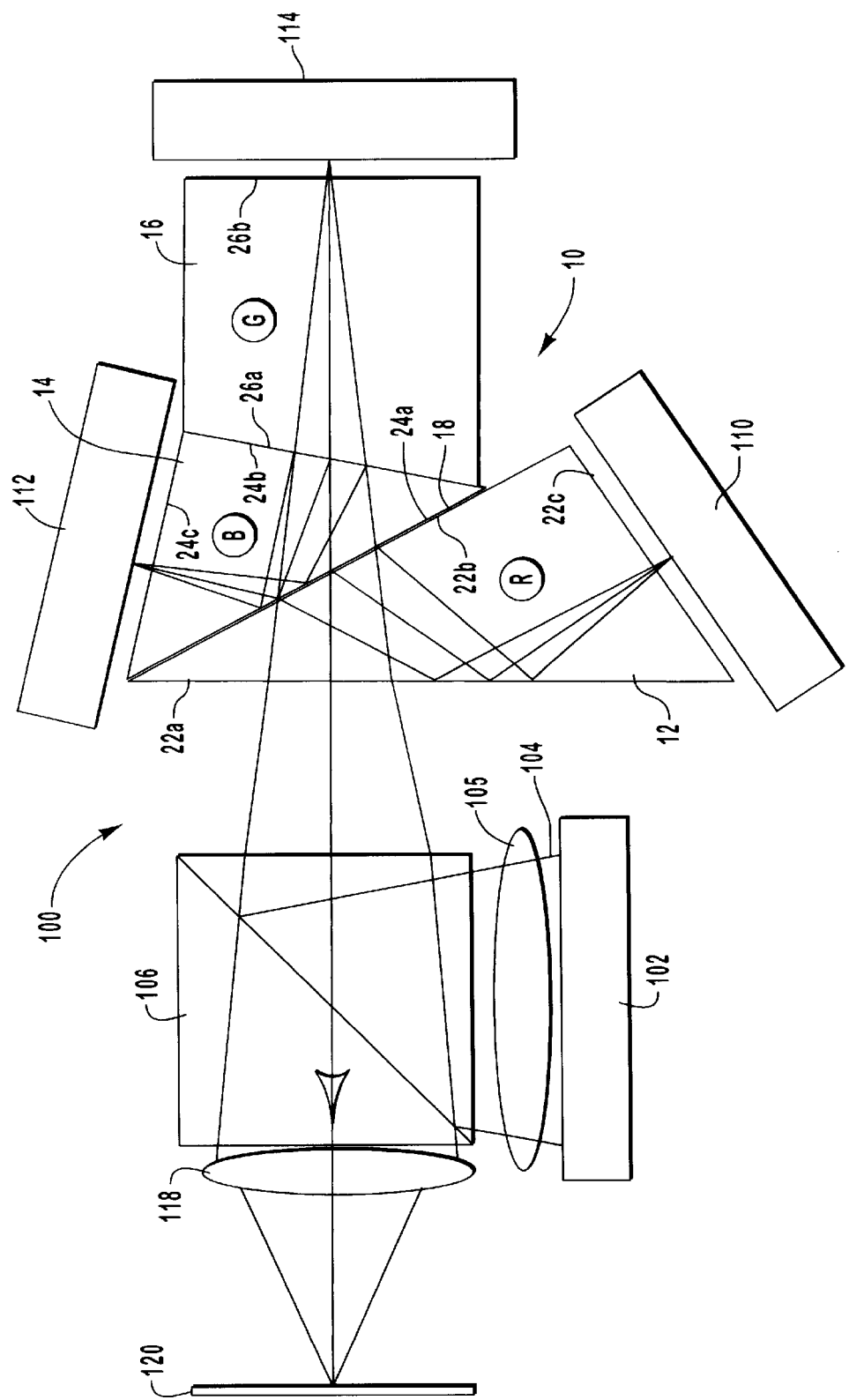
FIG. 2 is a schematic diagram illustrating the operation of a conventional prism assembly used in a liquid crystal light valve imaging system.

FIG. 2 is a schematic diagram illustrating the operation of prism assembly 10 in a conventional liquid crystal light valve imaging system 100. A light source 102 provides the illumination in imaging system 100 for forming an image. The light source 102 emits unpolarized light 104 which passes through an optical filter 105 such as a color tuning filter or a notch filter which tunes the wavelength range of the light required for imaging system 100. The light from optical filter 105 is incident on a polarizing device 106, typically a polarizing beam splitter, and light of a selected polarization is reflected into prism assembly 10. The first triangular prism 12 of prism assembly 10 receives incident light at an entrance facet 22a thereof. The prism 12 has a dichroic coating (not shown) on a first exit facet 22b which is opposite entrance facet 22a. The dichroic coating defines the wavelength range for a first color channel in imaging system 100. Light reflected by this dichroic coating is totally internally reflected at the surface of facet 22a toward a second exit facet 22c and is transmitted through facet 22c. Light of a first color such as red is thereby selected and directed to a first spatial image modulation device 110 such as an LCD.

The second triangular prism 14 is attached at an entrance facet 24a to exit facet 22b of prism 12 so as to form a precise air gap 18 therebetween. The prism 14 has a dichroic coating on a first exit facet 24b opposite air gap 18. This dichroic coating defines the wavelength range for a second color channel in imaging system 100. Light reflected at facet 24b exits prism 14 at a second exit facet 24c after total internal reflection at facet 24a. Light of a second color such as blue is thereby selected and directed to a second spatial image modulation device 112.

The third prism 16 has an entrance facet 26a which is optically bonded or cemented to facet 24b of prism 14 and is in contact with the dichroic coating on facet 24b. A third color channel is defined by the remaining wavelengths of light which pass into prism 16 from prism 14 that have not been subtracted from the incident beam by the preceding dichroic coatings in the physical path of the light. Light of a third color such as green exits prism 16 at an exit facet 26b and is directed to a third spatial image modulation device 114.

Figure 3:
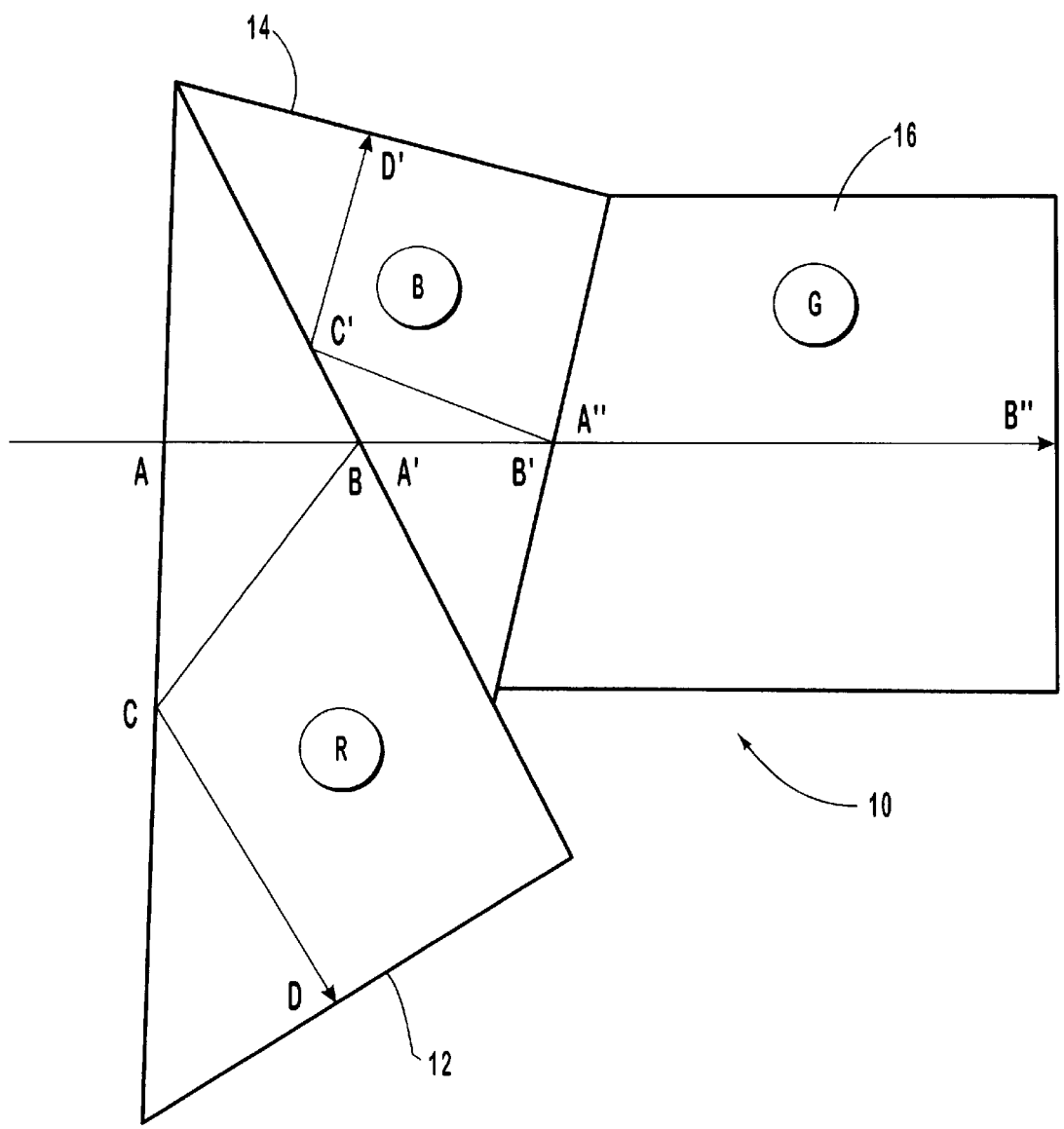
FIG. 3 is a schematic diagram illustrating the ray paths of a conventional prism assembly in which all three prisms have nominal dimensions and are assembled in their nominal positions.

FIG. 3 is a schematic diagram illustrating the light ray paths of prism assembly 10 in which all three prisms 12, 14, and 16 have nominal dimensions and are assembled in their nominal positions. The physical paths in these three prisms are indicated in FIG. 3 by the segments of the ray diagram, and must meet the condition: ABCD=ABA'B'C'D'= ABA'B'A"B".

It should be understood that the color separated by each prism element is determined by the optical reflection and transmission characteristics of the associated dichroic coating utilized, and that any of the prism elements can be configured with appropriate dichroic coatings to separate either red, blue or green light. The dichroic coatings on the first two prisms act to separate two wavelength regions. Thus, the color transmitted by the third prism is determined by the first two prisms.

The spatial image modulation devices 110, 112 and 114 retroreflect each color channel back through prism assembly 10 providing a spatial modulation of the initial polarization state of the light. The modulated image exits prism assembly 10 and passes to polarizing device 106. The polarizing device 106 selectively transmits only one polarization state to a projection lens 118, such that the final image, projected onto a viewing screen 120, is composed by selective activation of individual pixels for each color in the image.

The brightness and color balance of the final projected image is achieved by blending the colors from each of the three separate color images. Precise spatial overlap of each pixel in each of the three image modulation devices is required to properly blend colors and obtain a high-resolution final image. Detrimental aberrations can be inherent in the design and selection of optical components or due to errors in their alignment and assembly. The Philips prism is one potential source of undesirable optical aberration. Thus, a need exists to control and correct for any aberrations in the optical system that defocus the three color channel images.

The present invention provides a technique for reproducibly designing and assembling prism elements to correct for potential aberrations. In addition, the invention provides a way to use a Philips prism to correct for aberrations caused by other optical components. The invention also provides a precise and rapid method for assembling optical components that act in cooperation with each color channel, which eliminates chromatic aberrations caused by improper alignment in the assembly of these components. The methods of the invention are applicable to a broad range of optical systems which utilize Philips prisms. An example of such a system is disclosed in U.S. Pat. No. 5,658,060, which is incorporated herein by reference.

A color separation device according to the invention includes a first prism having a first air equivalent thickness, a second prism having a second air equivalent thickness which is attached to the first prism, and a third prism having a third air equivalent thickness which is attached to the second prism. The second prism is offset from the first prism such that the air equivalent thicknesses for light selected by each of the first and second prisms are substantially equal. In addition, the third prism is offset from the first and second prisms such that the air equivalent thickness of light selected by the third prism is substantially equal to that selected by the first and second prisms.

In a method for assembling the color separation device according to the invention, the physical dimensions of the first and second prisms are measured and the path length in the first prism is calculated. An air equivalent thickness difference between the first and second prisms is then determined. A first physical offset distance is then determined to correct for the air equivalent thickness difference between the first and second prisms such that the air equivalent thickness is the same for the second prism path (through both the first and second prisms) and the first prism path. The first and second prisms are attached at interfacing sides such that the first and second prisms are displaced at their interfacing sides by the first physical offset distance. The physical dimensions of the third prism can be optionally measured, and an air equivalent thickness difference between the first and third prisms is determined. A second physical offset distance is then determined for the third prism to correct for the air equivalent thickness difference between the first and third prisms. The third prism is attached to the second prism such that the second and third prisms are displaced at their interfacing sides by the second physical offset distance.

When the color separation device is used in an optical imaging display system, the first, second, and third prisms can be assembled to provide a predetermined chromatic aberration, which compensates for a chromatic aberration caused by the optical components such as lenses in the display system.

Figure 4:
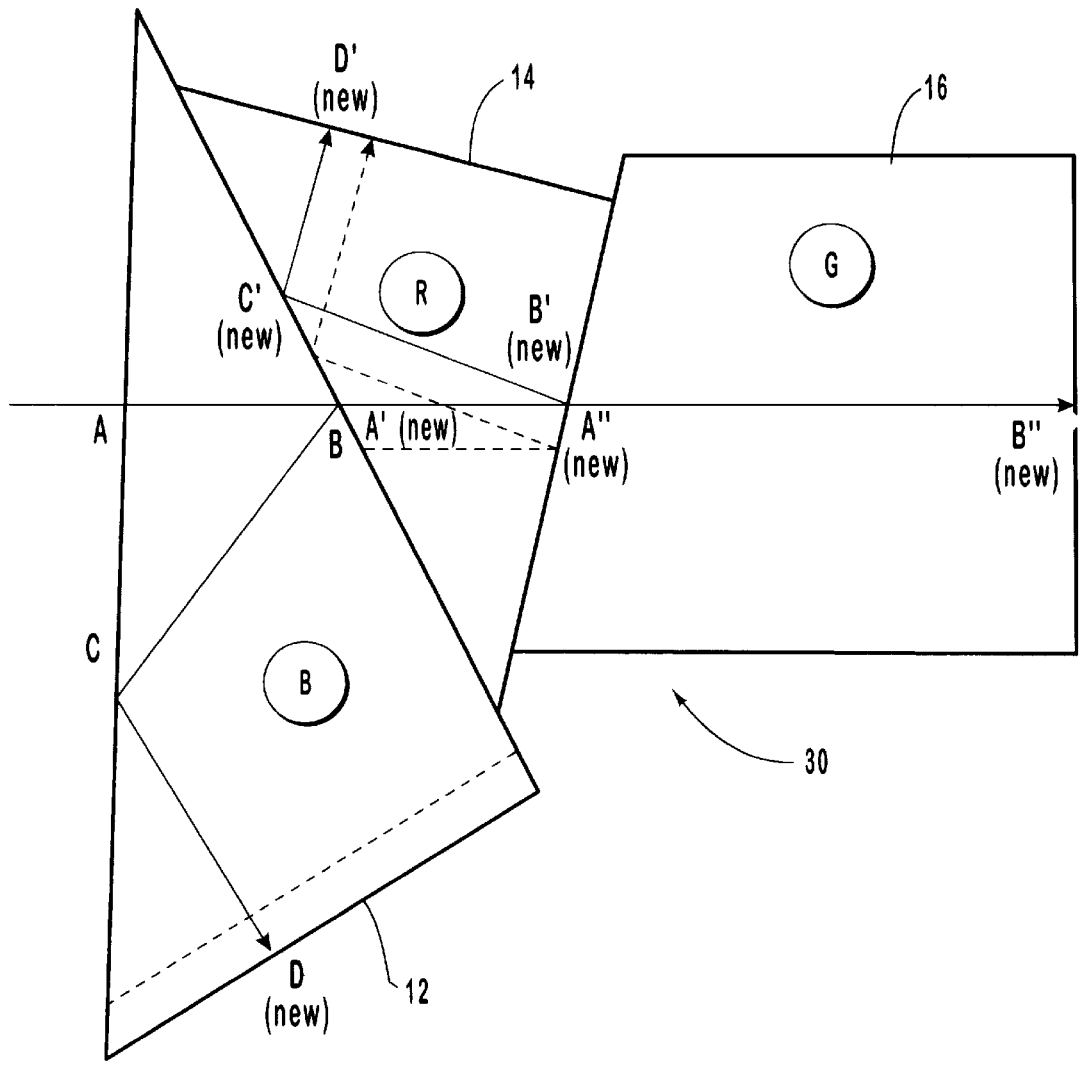
FIG. 4 is a schematic diagram illustrating one embodiment of the present invention in which the first prism is made longer than its nominal dimension and the second and third prisms are assembled with an offset from the nominal position shown in FIG. 3.

FIG. 4 shows a ray diagram for a prism assembly 30 in accordance with one embodiment of the present invention, in which prism 14 is assembled with an offset with respect to prisms 12 and 16 from the nominal position shown for prism 10 in FIG. 3. The dashed arrowed line in prism 14 represents the physical path for a prism assembly having no deviation from the nominal design in FIG. 3. The dashed line in prism 12 represents the nominal position for the now longer side of prism 12 forming the exit facet adjacent prism 14. The solid segment lines in prism 30 represent the actual physical path caused by the deviations in prisms 12 and 14 utilized to assemble prism 30 in the corrective offset position as shown in FIG. 4. It can be seen that the prisms are offset in one dimension whereby the parallel relationship between connected facets is maintained and the path lengths are equalized such that: (ABCD)new=(ABA'B'C'D')new. The prism 16 is displaced a distance away from the common edge with prism 14 by translating its common facet parallel to the interface. The amount of displacement for prism 16 is calculated such that: (ABCD)new=(ABA'B'A"B") new.

Figure 5:
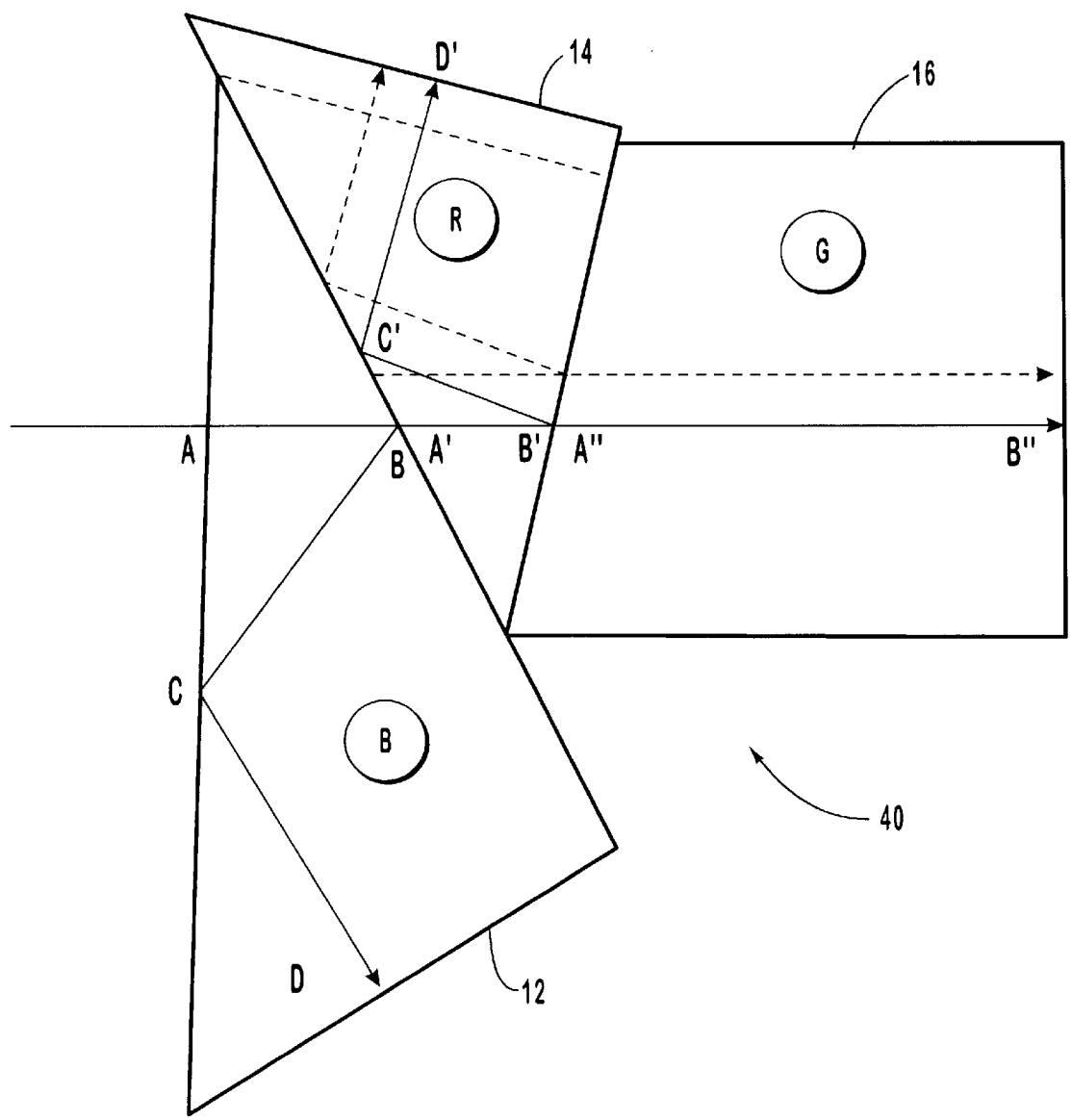
FIG. 5 is a schematic diagram illustrating another embodiment of the present invention in which the second prism is made longer than its nominal dimension and the second and third prisms are assembled with an offset from the nominal position shown in FIG. 3.

FIG. 5 shows a ray diagram for a prism assembly 40 in accordance with another embodiment of the invention, in which prism 14 is assembled with a different offset with respect to prisms 12 and 16 from the nominal position shown for prism 10 in FIG. 3. The dashed arrowed line in prism 14 represents the physical path for a prism assembly having no deviation from the nominal design in FIG. 3. The dashed line in prism 14 intersecting the arrowed dashed line represents the nominal position for the now longer side of prism 14 forming the exit facet at D'. The solid segment lines in prism 40 represent the actual physical path caused by the deviation in prism 14 utilized to assemble prism 40 in the corrective offset position as shown in FIG. 5.

Since the offsetting of the prism elements in the embodiments of the invention may reduce the image area of a projected image, the prism assembly should be oversized to accommodate for the desired offsets from the nominal design based on the expected deviations from the nominal prism element dimensions.

Figure 6:
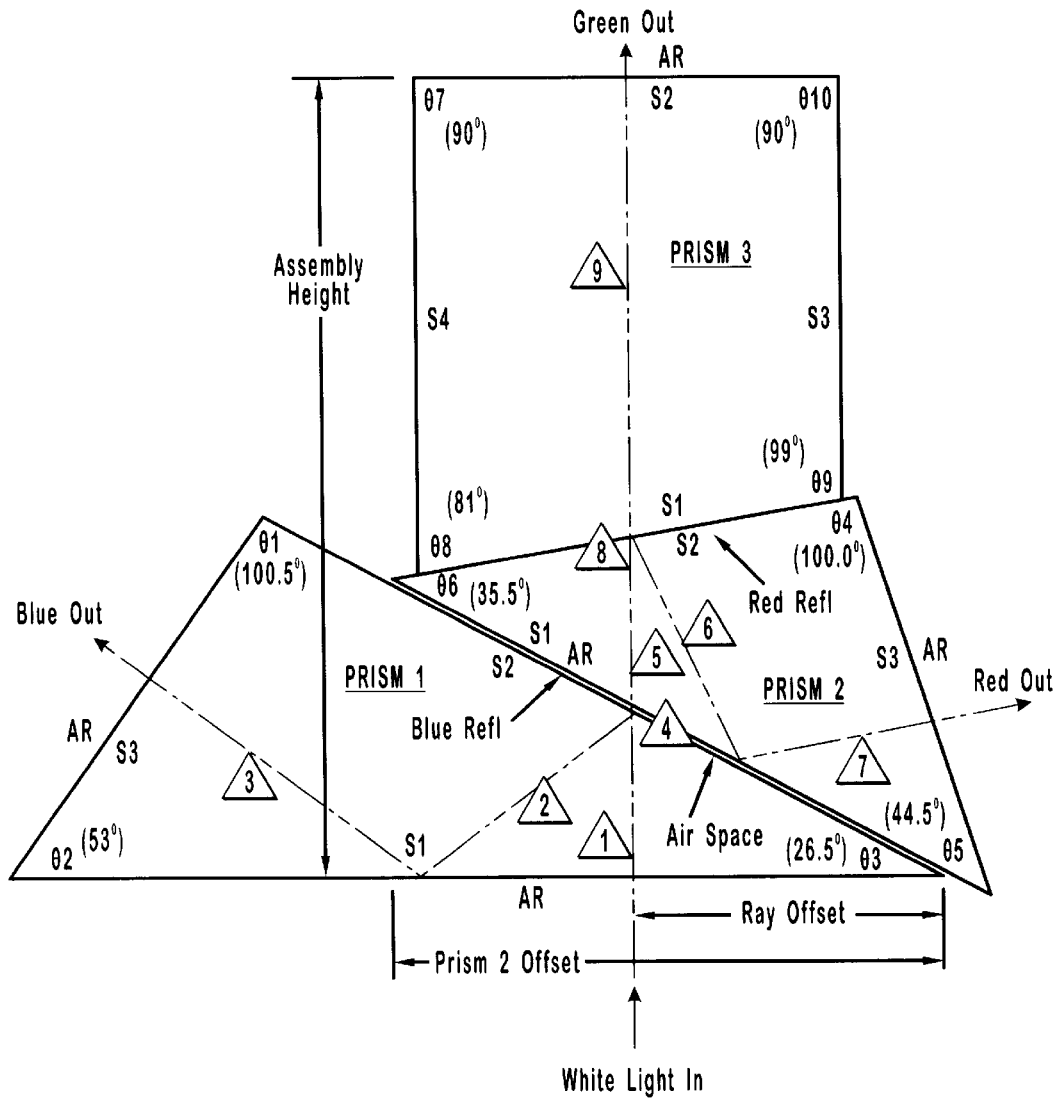
FIG. 6 is a schematic diagram illustrating the angles and sides of each prism component used to calculate the prism offset distances in the assembly process.

FIG. 6 defines the physical dimensions which are measured on each prism element, the first physical offset (prism 2 offset), and the second physical offset (assembly height). The offset dimensions are calculated from the physical dimensions to adjust the physical and air equivalent thickness for each color channel independently to the desired or predetermined value. These calculations are based on geometric and optical principles, and are discussed in further detail below in the Examples. The prism assembly ray diagrams of FIGS. 4 and 5 were generated using these calculations.

In the conventional method of manufacturing liquid crystal projection display systems, the liquid crystal image modulation devices must be accurately positioned with respect to the color separation prism so that the projected image is formed by the matched overlap of pixels from each of the three image modulation devices. Conventionally, the image modulation device is attached to the assembled prism with an air gap therebetween. The air gap thickness is manually adjusted to accommodate for variations in optical path length between each of the three color channels arising from chromatic dispersion prism-to-prism variations.

Adjustable parameters during the attachment process, in addition to the air gap thickness, are:

1. tilt of the image modulation device front surface about the x-axis;
2. tilt of the image modulation device front surface about the y-axis;
3. rotation of the image modulation device about the z-axis;
4. linear alignment or displacement of the image modulation device along the x-axis; and
5. linear alignment or displacement of the image modulation device along the y-axis.

Figure 7A:
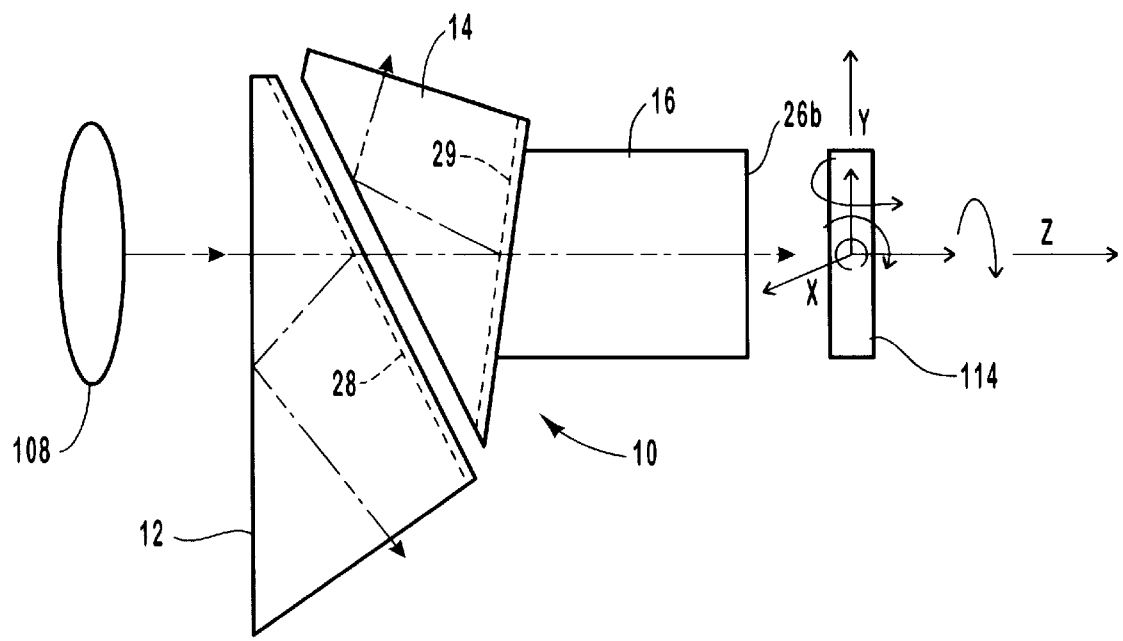
FIGS. 7A and 7B are schematic diagrams for comparing prior art methods of aligning optical components, including the Philips prism used to construct an optical image acquisition or display system.
Figure 7B:
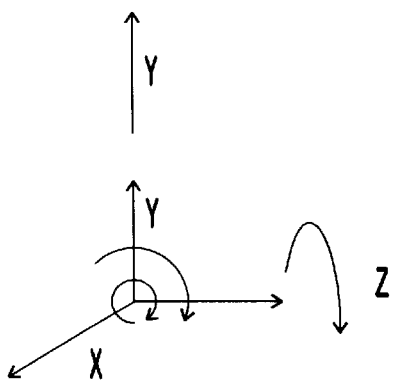

FIGS. 7A and 7B are schematic diagrams illustrating a prior art method of aligning and assembling an image modulation device 114, such as a liquid crystal light valve, with respect to a prism assembly 10 such as a Philips prism used to construct an optical image acquisition or display system. FIG. 7A illustrates a conventional system in which light is directed by lens 108 into prism assembly 10, and is reflected and transmitted at various wavelengths within prisms 12 and 14 by dichroic coatings 28 and 29. The image modulation device 114 is positioned at a focal distance from exit facet 26b of prism 16. The image modulation device must be precisely aligned on an optical test bench by manipulating various spatial parameters, which are depicted in the diagram of FIG. 7B by lines and semicircles with arrows in relation to a three-dimensional (x, y, z) coordinate system. These spatial parameters include: focal distance from the prism exit facet (z-axis linear alignent), linear alignment in the x-axis direction, linear alignment in the y-axis direction, and rotational or tilt alignment about the x, y and z axes.

The above method for aligning an image modulation device is simplified and improved in the following manner when prisms formed by the inventive process are utilized. By reducing or eliminating the air gap thickness adjustment, the aforementioned tilt, rotation, and linear alignment or displacement adjustments can be simplified or reduced to the extent that the image modulation device has a planar front surface and the center and orthogonal axes of the image modulation device can be pre-characterized or controlled.

In the ideal case, physical spacers alone would be sufficient to adjust the air gap thickness and eliminate an adjustment of tilt about the x-axis and y-axis. When the use of physical spacers alone is precluded, a smaller range of air gap adjustment, arising from improvements in the optical path length match within the prism, reduces the time necessary to fully complete the other adjustments which cannot be eliminated.

Figure 8A:
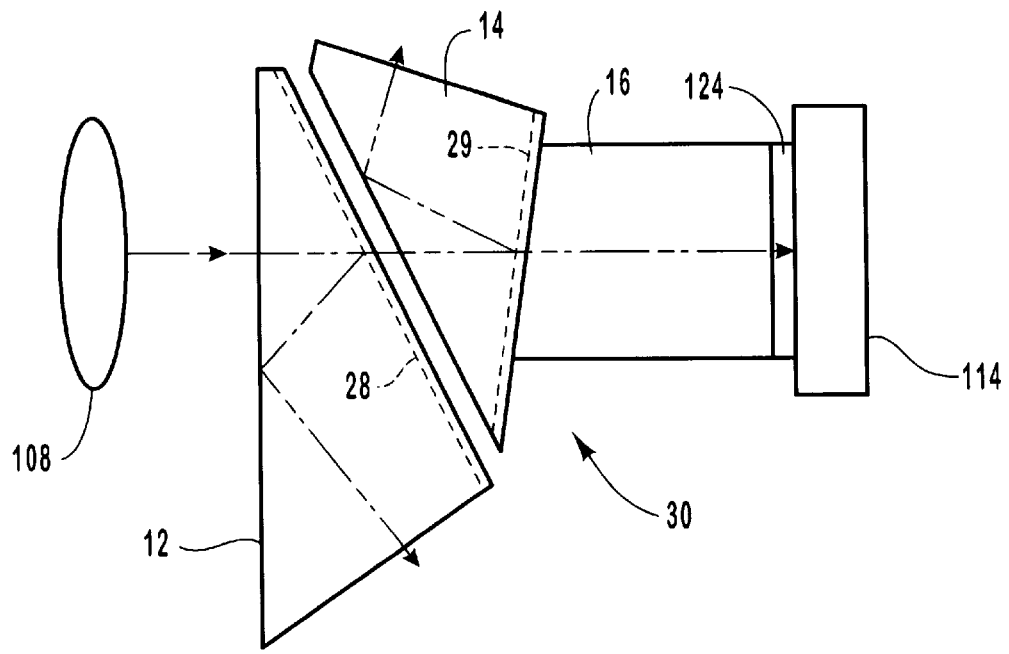
FIGS. 8A and 8B illustrate additional embodiments of the invention for attaching optical components directly to a Philips prism in which the alignment procedure is simplified.
Figure 8B:
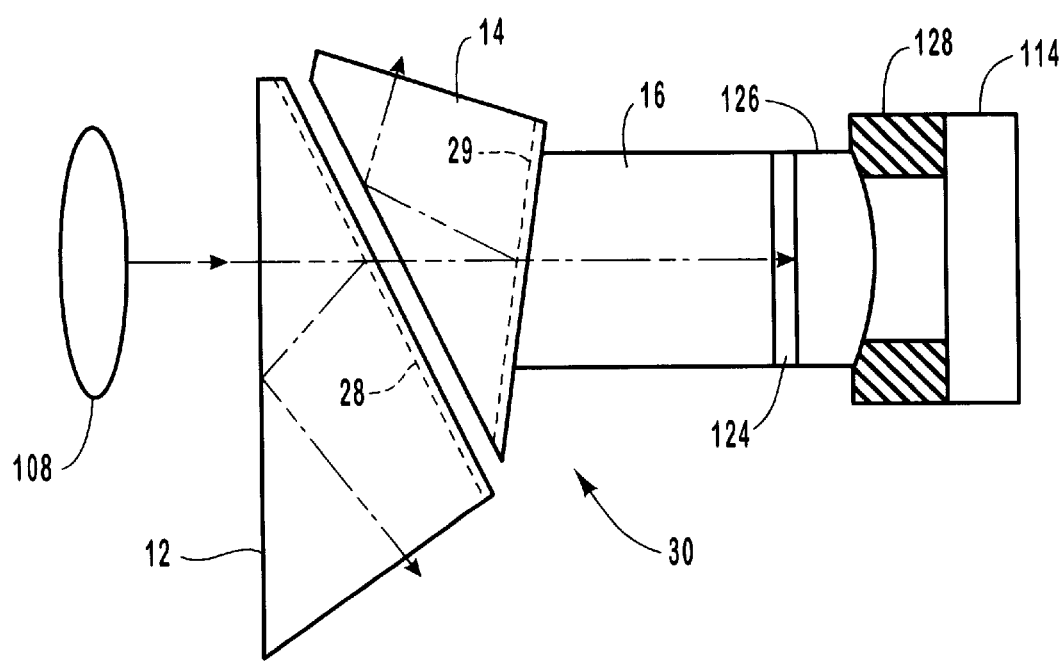

FIGS. 8A and 8B illustrate additional embodiments of this invention when the image modulation device, or another optical component, has ideal characteristics permitting direct attachment to prism assembly 30.

FIG. 8A illustrates one embodiment in which image modulation device 114 is aligned and optically bonded directly to the exit facet of prism 16 using a substantially uniform optical adhesive layer 124. When the focal distance is short, image modulation device 114 can be directly bonded to the exit facet of prism 16 as shown in FIG. 8A. This provides a cost and performance advantage by eliminating the requirement for antireflection coatings on the exit facets of the prism elements and on the image modulators. The x and y linear alignments can be automated to correspond to the beam offset characteristic of each prism element and their resulting combination by precisely calculating the beam offset from the corrected alignment positions of the prism elements. Alternatively, at least one image modulation device can be bonded to an exit facet of the corresponding prism element with an air gap between the image modulation device and the exit facet. The air gap distance is controlled by at least one fixed physical spacer connecting a perimeter region of the image modulation device and a perimeter region of the exit facet. When a physical spacer is utilized, at least one antireflection coating is formed on either the exit facet of the prism or on the image modulation device.

FIG. 8B depicts a further embodiment in which a field lens 126 at a first surface thereof is directly bonded to the exit facet of prism 16 using an optical adhesive layer 124. The field lens 126 is provided to correct for lateral chromatic aberration. In an analogous manner to the bonding of the image modulation device shown in FIG. 8A, the present prism assembly method eliminates the need to provide a z-axis linear adjustment which arises from the combined tolerance errors of prisms 12, 14 and 16. A second surface of field lens 126 is opposite image modulation device 114 with an air gap formed therebetween. When field lens 126 is directly bonded to the exit facet of prism 16, at least one physical spacer 128 can be provided to indirectly attach image modulation device 114 to prism 16 resulting in the air gap between field lens 126 and image modulation device 114. The spacer 128 can be a separate component or can be manufactured into field lens 126. In either case, spacer 128 preserves the planar relationship between the exit facet and the front face of image modulation device 114. The thickness of the air gap is controlled by the fixed physical spacer 128 which connects a perimeter region of image modulation device 114 and a perimeter region of the second surface of field lens 126. Preferably, at least one antireflection coating is formed on either the second surface of field lens 126 or on image modulation device 114.

It should be understood that optical components such as image modulators and lenses can be directly or indirectly bonded to the exit facets of the other prism components of prism assembly 30 in the same manner as described above for FIGS. 8A and 8B.

The following examples illustrate various features of the present invention, and are not intended to limit the scope of the present invention.

EXAMPLE 1

This example is described below with reference to FIG. 6. Each of prisms 1, 2 and 3 of the prism assembly in FIG. 6 is characterized by measuring two angles and the length of one side. Prism 2 is offset from prism 1 by using one edge in reference to a zero position, the zero position being one apex of prism 1. The edge of each prism will be referred to by the corresponding angle number, i.e., the edge of prism 1 having angle θ1 will be referred to as edge 1. Edge 3 of prism 1 is used as the reference point for positioning prism 2. Side S1 of prism 1 is used as the reference for positioning side S2 of prism 3. The prism 2 offset distance is measured from edge 3 parallel to side S1 of prism 1 to the intersection of a line perpendicular with side S1 of prism 1. This perpendicular line has an intersection with the corresponding edge 6 of prism 2, establishing the offset with respect to prism 1. The prism offset distances are labeled in FIG. 6.

Prism 1 is characterized by measuring the following two angles and one side: θ1, θ3, and S2. Prism 2 is characterized by measuring the following two angles and one side: θ4, θ6, and S2.

Prism 2 is positioned with respect to prism 1 such that edge 6 is at the prism 2 offset distance and side S1 of prism 2 forms a parallel air gap (e.g., 0.001 inch (20 micron)) with side S2 of prism 1. Prism 2 is bonded to Prism 1 at their edges. This can be accomplished by introducing a liquid UV curable adhesive of relatively high viscosity at the adjoining sides of the prisms and then curing the adhesive before it can wick into the air gap. The air gap can be measured and aligned using shim strips and/or autocollimation optical alignment techniques.

When the prisms are assembled in a machine automated process, a preferred method of producing a repeatable air gap is to utilize an optical adhesive composition that includes a transparent filler material such as uniform spacer beads (e.g., glass micro-spheres or plastic micro-spheres), glass rods, or glass fibers. The physical dimensions of the transparent filler material control the thickness of the adhesive layer bonding the prisms together. A representative adhesive formulation is, for example, Norland 4US- 91 optical cement (Norland Adhesives, North Brunswick, N.J.) filled with 0.5–2.0 weight-% precision glass micro-spheres having a diameter of 20 microns (available from Duke Scientific, Palo Alto, Calif.). This formulation has a sufficiently high viscosity that it can be applied at the perimeter of the active or useful viewing area of prism 1 as a continuous bead. Prism 2 is accurately positioned with respect to prism 1 and pressed into firm contact whereby the air gap is set by the diameter of the micro-spheres. The first and second prisms are held together as the adhesive is cured in a conventional manner, resulting in their permanent attachment.

Prism 3 is characterized by measuring the following two angles and two sides: θ7, θ8, and S2, S4. Prism 3 is positioned with respect to prism 2 whereby the offset is characterized by a predetermined height of the prism assembly, measured from side S2 of prism 3 to side S1 of prism 1. Side S1 of prism 3 is facebonded or optically cemented to side S2 of prism 2. The surfaces of sides S1 and S2 can be face bonded after physical positioning using various types of optical methods that are known to one having ordinary skill in the art.

The calculations for determining the prism offset are provided by a series of formulas linked in a spreadsheet format as shown in Table 1 below. The spreadsheet format provides in column H the equations for calculating a physical path length and in column 1 the equations for calculating a reduced path length (the physical path divided by the refractive index). The reduced path length must be matched at the color channel wavelengths to superimpose the three images at the focal plane.

Tables 2, 3, and 4 below provide examples of the calculations corresponding to the ray diagrams of FIGS. 3, 4, and 5, respectively, where the reduced path length is calculated for each color channel. The physical length in mm is calculated for segments 1–9 (represented in FIG. 6 by the numbers within the triangles). Physical dimensions are input in column E for the respective angle or side in the same row as indicated by column B. The refractive index of the prism material, BK7 glass, is 1.520 at 587.6 nm. The optical adhesive (Norland NOA61) has a refractive index of 1.56. The total path length in prism 1 is calculated as the sum of segments 1, 2 and 3 (e.g., 128 mm in spreadsheet cell in column H, row 15 of Table 1).

In order to equalize the path length for prism 2 (cell having column labeled "measured" and row labeled "green"), the value for the prism 2 offset (cell in column E, row 29) can be modified by the user. This can be done routinely using any spreadsheet software program, for example the "goal seek" or "solver function" provided by the "Excel" program, which is a product of Microsoft Corporation of Redmond, Wash.

In order to equalize the path length for the third prism (cell in column H, row 67), the value of the prism assembly height (cell in column E, row 56) is modified by the user.

It may be necessary to grind surface S4 of prism 3 (e.g., Side (gnd) in column B, row 69 of Table 1), depending on the offset requirements for prism 2 and prism 3, in order to allow a clearance between edge 8 and side S2 of prism 1. Depending on the physical dimensions of the optical components surrounding the prism, it may be necessary to grind and polish surfaces that protrude outside a predetermined boundary. This can be done by one of ordinary skill in the art by drawing the optimum prism configuration, using the dimensions calculated by the methods previously described, and comparing the drawing with an assembly diagram to obtain the required clearances between components. The grinding and polishing operation should be performed prior to assembly of the individual prism elements, after which they should be remeasured according to the methods of the invention.

EXAMPLE 2

In this example, a correction is made for chromatic aberration of the entire optical system such that the air equivalent thicknesses are not equal, but have a predetermined difference. This provides for opportunities to lower the optical system cost by using plastic optical components normally having a high chromatic aberration, while improving the optical system performance, and allowing for simplification of the projection lens. This predetermined difference can be calculated by one having ordinary skill in the art using optical ray tracing software programs, such as "Code V", which is produced by Optical Research Associates of Pasadena, Calif., by providing the appropriate characterization of refractive index dispersion for the materials used in each lens, prism or other optical element which contributes to chromatic aberration in the system.

The assembly method of the prism elements is exactly the same as in Example 1. The spreadsheet format of Table 4 is used to match the reduced path length for each color channel, which is the physical path length divided by the refractive index for the prism glass at the color channel wavelength (corresponding to the center of the passband for the dichroic filter on the same prism). The physical path lengths for ray segments that are common to two or more prisms are divided by the refractive index at the wavelength associated with the prism's color separation channel to arrive at the air equivalent thickness. The same cells in the spreadsheet used in Example 1 that are modified to match physical path lengths are now adjusted to obtain a predetermined difference in reduced path length.

Table 4 provides an example of these calculations wherein the chromatic aberration from optical system components other than the Philips prism are ignored. It can be seen by inspection of the spreadsheet in Table 4 that the first, or blue color channel prism was characterized by a reduced path length at a wavelength of 450 nm for physical path segments 1, 2, and 3 of prism 1. The red color channel was characterized by the sum of reduced path lengths at 650 nm for prisms 1 and 2 and segments 1, 4, 5, 6 and 7. The green color channel was characterized by the sum of reduced path lengths at 550 nm for prisms 1, 2 and 3 and segments 1, 4, 5, 8 and 9. In this case, the target air equivalent thickness for the second and third prisms is dependent on the air equivalent thickness in the first prism, which is calculated by dividing the physical path length in prism 1 by the refractive index of light at 450 nm separated by prism 1.

TABLE 1

| | A | B | C | D | E | F | G | H | I |
|---|---|---|---|---|---|---|---|---|---|
| 1 | | | | | | | | | |
| 2 | | BK7 index | 1.520 | (@587.6 nm) | | | | 14.040 | air equivalent thickness |
| 3 | | Adhesive index | 1.56 | (NOA61) | | | ray offset | | for a single wavelength |
| 4 | | | | | | | | physical path aplimization | d/n |
| 5 | | | | | measured | angle, radians | | physical dims. | reduced thick. |
| 6 | | | | | | | | (mm) | |
| 7 | | | nom. | | | | | | |
| 8 | Prism 1 | Prism 1 | | | | | Segment 1: | =H3*TAN(F11) | =H8/C2 |
| 9 | | Angle 1 | 96.0 | | 95.957 | =E9*PIO/180 | seg B | =H10/TAN(PO/2-2*F11) | |
| 10 | | (Angle 2) | 56.0 | | n/a | | Segment 2: | =H8/COS(2*F11) | =H10/C2 |
| 11 | | Angle 3 | 28 | | 27.997 | =E11*PIO/180 | side 1: | =E13*SIN(F9)/SIN(PIO-F9-F11) | |
| 12 | | | | | | | | | |
| 13 | | Side 2 | 40.215 | | 40.1 | | Segment 3: | =SIN(PIO-F9-F11)*(H11-H9-H3)/(SIN(3*F11+F9-PIO/2) | =H13/C2 |
| 14 | | | | | | BLUE | | | |
| 15 | | | | | | | Sum: | =H13 + H10 + H8 | =I13 + I10 + I8 |
| 16 | | | | | | | | | |
| 17 | | | | | | | "x": | ='prism data 1B12/TAN('calculations (2)'!F11) | |
| 18 | | | | | | | | | |
| 19 | Air Space | | | | | | | | |
| 20 | | Gap | 0.02 | | 0.025 | | angle in air: | =ASIN(C2*SIN(F11)) | |
| 21 | | | | | | | Segment 4: | =E20/COS(H20) | =E20/COS(H20) |
| 22 | | | | | | | beam displacement: | =H21*SIN(H20-F11) | |
| 23 | | | | | | | vertical disp: | =H21*COS(H20-F11) | |
| 24 | | Wedge angle | 0 | | 0 | =E24(PIO/180 | | | |
| 25 | | | | | (.02/30.4) | | angle F: | =ASIN(SIN(H20 + F24)/C2) | |
| 26 | | | | | | | angle G: | =PIO/2-H25 | |
| 27 | Prism 2 | | | | | | | | |
| 28 | | Prism 2 | | | | | | | |
| 29 | | | | | | | | | |
| 30 | | Prism 2 offset | | | 28.5943 | | | | |
| 31 | | Set Height | | | 9.45 | | vary this number to match red, blue | | |
| 32 | | | | | | | with calibration factor included | | |
| 33 | | Angle 4 | 93.25 | | 93.238 | =E22*PIO/180 | | | |
| 34 | | (Angle 5) | 48.5 | | n/a | | | | |
| 35 | | Angle 6 | 38.25 | | 28.267 | =E35*PIO/180 | | | |
| 36 | | Side 2 | 24.584 | | 24.649 | | | | |
| 37 | | | | | | | seg. N | =E(30-H3-H22)/SIN(H26) | |
| 38 | | | | | | | Segment 5: | =H37*SIN(H35)/SIN(PIO-F35-H26) | =H38/C2 |
| 39 | | | | | | | seg. M | =H37*SIN(H26)/SIN(PIO-F35-H26) | |
| 40 | | | | | | | angle J: | =(PIO-F35-H26) | |
| 41 | | | | | | | Segment 6: | =H39*SIN(F35)/SIN(H40-F35) | =H41/C2 |
| 42 | | | | | | | seg: p: | =H41*SIN(PIO-H40)/SIN(F35) | |
| 43 | | | | | | | seg: q: | =E36*SIN(F33)/SIN(PIO-F35-F33)-H42 | |
| 44 | | | | | | | angle L: | =H40 + F33 + 2*F35 | |
| 45 | | | | | | | Segment 7: | =H43(SIN(PIO-F35-F33)/SIN(H44) | =H45/C2 |
| 46 | | | | | | | Prism 2 path: | =H45 + H41 + H38 | =H46/C2 |
| 47 | | | | | | RED | sum: | =H46 + H21 + H8 | =I46 + I21 + I8 |
| 48 | | | | | | BLUE | Sum: | =H13 + H10 + H8 | -I15 |
| 49 | | | | | | | | | |

TABLE 1-continued

| A | B | C | D | E | F | G | H | I |
|---|---|---|---|---|---|---|---|---|
| 50 | | | | | | Y6= | =TAN(F11)*E30 + E20/COS(F11) | |
| 51 | | | | | | Y4= | =TAN(F11)*E30 + E20/COS(F11) + E36*(SIN(F35-F11-F24)) | |
| 52 | | | | | | YS= | =(TAN(F11)*E30 + E20/COS(F11) + E36*(SIN(F35-F11-F24))−E31 | |
| 53 | | | | | | angle K= | =PIO-F33-(F35-F11-F24) | |
| 54 | | | | | | X2= | =E36(COS(F35-F11-F24) | |
| 55 | | | | | | X3= | =H52/TAN(H53) | |
| 56 | | | | | 1.533 | Xset= | =E30 + (E36*COS(F35-F11-F24)) + H55 | |
| 57 | | | | | | | | |
| 58 | Prism 3 | | | | | | | |
| 59 | Assembly hgt(P1-S1 to P3-S2) | | | 39.851 | vary this number to match green, blue | | | |
| 60 | | | | | | | | |
| 61 | Bondline wedge (X*) | | | 0 | 0 | | | |
| 62 | Bond thickness (mm) | | | 0.015 | | | =E62/COS(PIO/2-H40) | |
| 63 | Angle 7 | 90.0 | | 90 | =E63*PIO/180 | Segment 8: | =H62 + H38 + H8 + H23 | =H26/C3 |
| 64 | Angle 8 | 81.0 | | 81 | =E65*PIO/180 | seg r(hdf): | =E59-H63 | =H64/C2 |
| 65 | (Angle 9) | 99.0 | | 99 | =E65*PIO/180 | Segment 9: | | |
| 66 | (Angle 10) | 90.0 | | 90 | =E66*PIO/180 | | | |
| 67 | | | | | | | | |
| 68 | S2 Face | 19.55 | | | | | | |
| 69 | Side (gnd) | 21.048 | | | | | | |
| 70 | | | | | | GREEN sum: | =H8 + H21 + H38 + H62 + H64 | =I8 + I21 + I38 + I62 + I64 |
| 71 | | | | | | BLUE Sum: | =H13 + H10 + H8 | −I15 |

TABLE 2

|  |  |  |  |  |  |  | Prism 1 | Prism 2 | Prism 3 |
|---|---|---|---|---|---|---|---|---|---|
|  | BK7 index | 1.520 | (@ 587.6 nm) |  |  |  | wavelength, nm | wavelength, nm | wavelength, nm |
|  | Adhesive Inc | 1.56 | (NOA61) |  | ray offset | 14.040 | 450 | 650 | 550 |
|  |  |  |  |  |  |  | 1.52532066 | 1.51852205 | 1.51452088 |
|  |  |  |  |  |  | physical dims | d/n | d/n | d/n |
|  |  | nom. | measured | angle, radians |  | (mm) | reduced thick. | reduced thick. | reduced thick. |
| Prism 1 | Prism 1 |  |  |  | Segment 1: | 7.4643 | 4.8936 | 4.9285 | 4.9155 |
|  | Angle 1 | 96.0 | 95.957 | 1.67476559 | seg B | 11.0637 |  |  |  |
|  | (Angle 2) | 56.0 | n/a |  | Segment 2: | 13.3462 | 8.7498 | 8.8122 | 8.7889 |
|  | Angle 3 | 28 | 27.997 | 0.48863983 | side 1: | 147.4838 |  |  |  |
|  | Side 2 | 123 | 123 |  | Segment 3: | 101.5127 | 66.5517 | 67.0263 | 66.8496 |
|  |  |  |  |  | BLUE Sum: | 122.3231 | 80.1950 | 80.7669 | 80.5541 |
|  | Bevel Compensation |  |  |  | "x": | 0.7862 |  |  |  |
| Air Space |  |  |  |  |  |  |  |  |  |
|  | Gap | 0.02 | 0.025 |  | angle in air: | 0.7945 |  | 0.7909 | 0.7935 |
|  |  |  |  |  | Segment 4: | 0.0357 |  | 0.0355 | 0.0356 |
|  |  |  |  |  | beam displacement: | 0.0107 |  | 0.0106 | 0.0107 |
|  |  |  |  |  | vertical disp: | 0.03403 |  | 0.03394 | 0.03400 |
|  | Wedge angle | 0 | 0 | 0 |  |  |  |  |  |
|  |  |  | (.02/30.4) |  | angle F: | 0.48863983 |  | 0.488639831 | 0.488639831 |
|  |  |  |  |  | angle G: | 1.0821565 |  | 1.082156496 | 1.082156496 |
| Prism 2 |  |  |  |  |  |  |  |  |  |
|  | Prism 2 |  |  |  |  |  |  |  |  |
|  | Prism 2 offset |  | 89.078409 | vary this number to match red, blue |  |  |  |  |  |
|  | Set Height |  | 9.45 | with calibration factor included |  |  |  |  |  |
|  | Angle 4 | 93.25 | 93.238 | 1.62731009 |  |  |  |  |  |
|  | (Angle 5) | 48.5 | n/a |  |  |  |  |  |  |
|  | Angle 6 | 38.25 | 38.267 | 0.66788514 |  |  |  |  |  |
|  | Side 2 | 75 | 75 |  |  |  |  |  |  |
|  |  |  |  |  | seg. N | 84.97172 |  |  |  |
|  |  |  |  |  | Segment 5: | 53.4821373 |  | 35.31290854 | 35.21986218 |
|  |  |  |  |  | seg. M | 76.2492905 |  |  |  |
|  |  |  |  |  | angle J: | 1.39155101 |  |  |  |
|  |  |  |  |  | Segment 6: | 71.3195186 |  | 47.09048225 | 46.96640303 |
|  |  |  |  |  | seg p: | 113.311518 |  |  |  |
|  |  |  |  |  | seg q: | −13.324237 |  |  |  |
|  |  |  |  |  | angle L: | 1.57152937 |  |  |  |
|  |  |  |  |  | Segment 7: | −9.97849567 |  | −6.5885 | −6.5712 |
|  |  |  |  |  | Prism 2 path: | 114.82316 |  | 75.8148 | 75.6151 |
|  |  |  |  |  | RED sum: | 122.3231 |  | 80.7789 | 80.5662 |
|  |  |  |  |  | BLUE Sum: | 122.3231 | 80.1950 |  |  |
|  |  |  |  |  | Y6= | 47.3862 |  |  |  |
|  |  |  |  |  | Y4= | 60.7577 |  |  |  |
|  |  |  |  |  | YS= | 51.3077 |  |  |  |
|  |  |  |  |  | angle K= | 1.3350 |  |  |  |
|  |  |  |  |  | X2= | 73.7984 |  |  |  |
|  |  |  |  |  | X3= | 12.3255 |  |  |  |
|  |  |  |  | 1.533 | Xset= | −2.9546 |  |  |  |
| Prism 3 |  |  |  |  |  |  |  |  |  |
|  | Assembly hgt(P1–S1 to P3- | 122.321 |  | vary this number to match green, blue |  |  |  |  |  |
|  | Bondline wedge (X") |  | 0 | 0 |  |  |  |  |  |
|  | Bond thickness (mm) |  | 0.015 |  | Segment 8: | 0.01524424 |  |  | 0.0098 |
|  | Angle 7 | 90.0 | 90 | 1.57079633 | seg r(hgt): | 60.9957 |  | n/a |  |
|  | Angle 8 | 81.0 | 81 | 1.41371669 | Segment 9: | 61.3258 |  | 40.3852 |  |
|  | (Angle 9) | 99.0 | 99 | 1.72787596 |  |  |  |  |  |
|  | (Angle 10) | 90.0 | 90 | 1.57079633 |  |  |  |  |  |
|  | S2 Face |  | 19.55 |  |  |  |  |  |  |
|  | Side (gnd) |  | 21.048 |  |  |  |  |  |  |
|  |  |  |  |  | GREEN sum: | 122.3231 |  |  | 80.5659 |
|  |  |  |  |  | BLUE Sum: | 122.3231 | 80.1950 |  |  |
|  |  |  |  |  |  |  | blue | red | green |
|  |  |  |  |  |  |  | 80.1950 | 80.7789 | 80.5659 |

TABLE 3

|  |  |  |  |  |  |  | Prism 1 | Prism 2 | Prism 3 |
|---|---|---|---|---|---|---|---|---|---|
|  | BK7 index | 1.520 | (@ 587.6 nm) |  |  |  | wavelength, nm | wavelength, nm | wavelength, nm |
|  | Adhesive Inc | 1.56 | (NOA61) |  | ray offset | 14.040 | 450 | 650 | 550 |
|  |  |  |  |  |  |  | 1.52532066 | 1.51852205 | 1.51452088 |
|  |  |  |  |  |  | physical dims | d/n | d/n | d/n |

TABLE 3-continued

|  |  | nom. | measured | angle, radians |  | (mm) | Prism 1 reduced thick. | Prism 2 reduced thick. | Prism 3 reduced thick. |
|---|---|---|---|---|---|---|---|---|---|
| Prism 1 | Prism 1 |  |  |  | Segment 1: | 7.4643 | 4.8936 | 4.9285 | 4.9155 |
|  | Angle 1 | 96.0 | 95.957 | 1.647476559 | seg B | 11.0637 |  |  |  |
|  | (Angle 2) | 56.0 | n/a |  | Segment 2: | 13.3462 | 8.7498 | 8.8122 | 8.7889 |
|  | Angle 3 | 28 | 27.997 | 0.48863983 | side 1: | 153.4791 |  |  |  |
|  | Side 2 | 123 | 128 |  | Segment 3: | 106.4857 | 69.8120 | 70.3098 | 70.1245 |
|  |  |  |  | BLUE | Sum: | 127.2961 | 83.4553 | 84.0504 | 83.8290 |
|  | Bevel Compensation |  |  |  | "x": | 0.7862 |  |  |  |
| Air Space |  |  |  |  |  |  |  |  |  |
|  | Gap | 0.02 | 0.025 |  | angle in air: | 0.7945 |  | 0.7909 | 0.7935 |
|  |  |  |  |  | Segment 4: | 0.0357 |  | 0.0355 | 0.0356 |
|  |  |  |  |  | beam displacement: | 0.0107 |  | 0.0106 | 0.0107 |
|  |  |  |  |  | vertical disp: | 0.03403 |  | 0.03394 | 0.03400 |
|  | Wedge angle | 0 | 0 (.02/30.4) | 0 |  |  |  |  |  |
|  |  |  |  |  | angle F: | 0.48863983 |  | 0.488639831 | 0.488639831 |
|  |  |  |  |  | angle G: | 1.0821565 |  | 1.082156496 | 1.082156496 |
| Prism 2 |  |  |  |  |  |  |  |  |  |
|  | Prism 2 |  |  |  |  |  |  |  |  |
|  | Prism 2 offset |  | 98.419564 | vary this number to match red, blue |  |  |  |  |  |
|  | Set Height |  | 9.45 | with calibration factor included |  |  |  |  |  |
|  | Angle 4 | 93.25 | 93.238 | 1.62731009 |  |  |  |  |  |
|  | (Angle 5) | 48.5 | n/a |  |  |  |  |  |  |
|  | Angle 6 | 38.25 | 38.267 | 0.66788514 |  |  |  |  |  |
|  | Side 2 | 75 | 75 |  |  |  |  |  |  |
|  |  |  |  |  | seg. N | 95.5509373 |  |  |  |
|  |  |  |  |  | Segment 5: | 60.1408133 |  | 39.70946462 | 39.60483372 |
|  |  |  |  |  | seg. M | 85.7425408 |  |  |  |
|  |  |  |  |  | angle J: | 1.39155101 |  |  |  |
|  |  |  |  |  | Segment 6: | 80.1989986 |  | 52.95337926 | 52.81385184 |
|  |  |  |  |  | seg p: | 127.41912 |  |  |  |
|  |  |  |  |  | seg q: | −27.4318385 |  |  |  |
|  |  |  |  |  | angle L: | 1.57152937 |  |  |  |
|  |  |  |  |  | Segment 7: | −20.5436516 |  | −13.5645 | −13.5287 |
|  |  |  |  |  | Prism 2 path: | 119.79616 |  | 79.0984 | 78.8900 |
|  |  |  |  | RED | sum: | 127.2961 |  | 84.0624 | 83.8411 |
|  |  |  |  | BLUE | Sum: | 127.2961 | 83.4553 |  |  |
|  |  |  |  |  | Y6= | 52.3523 |  |  |  |
|  |  |  |  |  | Y4= | 65.7238 |  |  |  |
|  |  |  |  |  | YS= | 56.2738 |  |  |  |
|  |  |  |  |  | angle K= | 1.3350 |  |  |  |
|  |  |  |  |  | X2= | 73.7984 |  |  |  |
|  |  |  |  |  | X3= | 13.5185 |  |  |  |
|  |  |  |  | 1.533 | Xset= | −11.1027 |  |  |  |
| Prism 3 |  |  |  |  |  |  |  |  |  |
|  | Assembly hgt(P1–S1 to P3- |  | 127.294 | vary this number to match green, blue |  |  |  |  |  |
|  | Bondline wedge (X") |  | 0 | 0 |  |  |  |  |  |
|  | Bond thickness (mm) |  | 0.015 |  | Segment 8: | 0.01524424 |  |  | 0.0098 |
|  | Angle 7 | 90.0 | 90 | 1.57079633 | seg r(hgt): | 67.6543 |  | n/a |  |
|  | Angle 8 | 81.0 | 81 | 1.41371669 | Segment 9: | 59.6401 |  |  | 39.2751 |
|  | (Angle 9) | 99.0 | 99 | 1.72787596 |  |  |  |  |  |
|  | (Angle 10) | 90.0 | 90 | 1.57079633 |  |  |  |  |  |
|  | S2 Face |  | 19.55 |  |  |  |  |  |  |
|  | Side (gnd) |  | 21.048 |  |  |  |  |  |  |
|  |  |  |  | GREEN | sum: | 127.2961 |  |  | 83.8408 |
|  |  |  |  | BLUE | Sum: | 127.2961 | 83.4553 |  |  |
|  |  |  |  |  |  |  | blue | red | green |
|  |  |  |  |  |  |  | 83.4553 | 84.0624 | 83.8408 |

TABLE 4

|  |  |  |  |  |  |  | Prism 1 | Prism 2 | Prism 3 |
|---|---|---|---|---|---|---|---|---|---|
|  | BK7 index | 1.520 | (@ 587.6 nm) |  |  |  | wavelength, nm | wavelength, nm | wavelength, nm |
|  | Adhesive Inc | 1.56 | (NOA61) |  | ray offset | 14.040 | 450 | 650 | 550 |
|  |  |  |  |  |  |  | 1.52532066 d/n | 1.51852205 d/n | 1.51452088 d/n |
|  |  | nom. | measured | angle, radians |  | physical dims (mm) | reduced thick. | reduced thick. | reduced thick. |
| Prism 1 | Prism 1 |  |  |  | Segment 1: | 7.4643 | 4.8936 | 4.9285 | 4.9155 |
|  | Angle 1 | 96.0 | 95.957 | 1.67476559 | seg B | 11.0637 |  |  |  |
|  | (Angle 2) | 56.0 | n/a |  | Segment 2: | 13.3462 | 8.7498 | 8.8122 | 8.7889 |

TABLE 4-continued

|  |  |  |  |  |  |  | Prism 1 | Prism 2 | Prism 3 |
|---|---|---|---|---|---|---|---|---|---|
|  | Angle 3 | 28 | 27.997 | 0.48863983 | side 1: | 147.4838 |  |  |  |
|  | Side 2 | 123 | 123 |  | Segment 3: | 101.5127 | 66.5517 | 67.0263 | 66.8496 |
|  |  |  |  | BLUE | Sum: | 122.3231 | 80.1950 | 80.7669 | 80.5541 |
|  | Bevel Compensation |  |  |  | "x": | 0.7862 |  |  |  |
| Air |  |  |  |  |  |  |  |  |  |
| Space |  |  |  |  |  |  |  |  |  |
|  | Gap | 0.02 | 0.025 |  | angle in air: | 0.7945 |  | 0.7909 | 0.7935 |
|  |  |  |  |  | Segment 4: | 0.0357 |  | 0.0355 | 0.0356 |
|  |  |  |  |  | beam displacement: | 0.0107 |  | 0.0106 | 0.0107 |
|  |  |  |  |  | vertical disp: | 0.03403 |  | 0.03394 | 0.03400 |
|  | Wedge angle | 0 | 0 | 0 |  |  |  |  |  |
|  |  |  | (.02/30.4) |  | angle F: | 0.48863983 |  | 0.488639831 | 0.488639831 |
|  |  |  |  |  | angle G: | 1.0821565 |  | 1.082156496 | 1.082156496 |
| Prism 2 |  |  |  |  |  |  |  |  |  |
|  | Prism 2 |  |  |  |  |  |  |  |  |
|  | Prism 2 offset |  | 78.040565 | vary this number to match red, blue |  |  |  |  |  |
|  | Set Height |  | 9.45 | with calibration factor included |  |  |  |  |  |
|  | Angle 4 | 93.25 | 93.238 | 1.62731009 |  |  |  |  |  |
|  | (Angle 5) | 48.5 | n/a |  |  |  |  |  |  |
|  | Angle 6 | 38.25 | 38.267 | 0.66788514 |  |  |  |  |  |
|  | Side 2 | 75 | 75 |  |  |  |  |  |  |
|  |  |  |  |  | seg. N | 72.4709363 |  |  |  |
|  |  |  |  |  | Segment 5: | 45.6140062 |  | 30.11777971 | 30.03842205 |
|  |  |  |  |  | seg. M | 65.0317243 |  |  |  |
|  |  |  |  |  | angle J: | 1.39155101 |  |  |  |
|  |  |  |  |  | Segment 6: | 60.8272057 |  | 40.16267223 | 40.05684717 |
|  |  |  |  |  | seg p: | 96.6414685 |  |  |  |
|  |  |  |  |  | seg q: | 10.0116313 |  |  |  |
|  |  |  |  |  | angle L: | 1.57152937 |  |  |  |
|  |  |  |  |  | Segment 7: | 7.49769159 |  | 4.9505 | 4.9375 |
|  |  |  |  |  | Prism 2 path: | 113.938904 |  | 75.2310 | 75.0328 |
|  |  |  |  | RED | sum: | 121.4388 |  | 80.1950 | 79.9839 |
|  |  |  |  | BLUE | Sum: | 122.3231 | 80.1950 |  |  |
|  |  |  |  |  | Y6= | 41.5180 |  |  |  |
|  |  |  |  |  | Y4= | 55.7809 |  |  |  |
|  |  |  |  |  | YS= | 46.3309 |  |  |  |
|  |  |  |  |  | angle K= | 1.3350 |  |  |  |
|  |  |  |  |  | X2= | 78.7183 |  |  |  |
|  |  |  |  |  | X3= | 11.1299 |  |  |  |
|  |  |  |  | 1.533 | Xset= | 11.8076 |  |  |  |
| Prism 3 |  |  |  |  |  |  |  |  |  |
|  | Assembly hgt(P1–S1 to P3- | 121.758 |  | vary this number to match green, blue |  |  |  |  |  |
|  | Bondline wedge (X") |  | 0 | 0 |  |  |  |  |  |
|  | Bond thickness (mm) |  | 0.015 |  | Segment 8: | 0.01524424 |  |  | 0.0098 |
|  | Angle 7 | 90.0 | 90 | 1.57079633 | seg r(hgt): | 53.1275 | n/a |  |  |
|  | Angle 8 | 81.0 | 81 | 1.41371669 | Segment 9: | 68.6306 |  |  | 45.1957 |
|  | (Angle 9) | 99.0 | 99 | 1.72787596 |  |  |  |  |  |
|  | (Angle 10) | 90.0 | 90 | 1.57079633 |  |  |  |  |  |
|  | S2 Face | 19.55 |  |  |  |  |  |  |  |
|  | Side (gnd) | 21.048 |  |  |  |  |  |  |  |
|  |  |  |  | GREEN | sum: | 121.7598 |  |  | 80.1950 |
|  |  |  |  | BLUE | Sum: | 122.3231 | 80.1950 |  |  |
|  |  |  |  |  |  |  | blue | red | green |
|  |  |  |  |  |  |  | 80.1950 | 80.1950 | 80.1950 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color separation device comprising:
   a first prism having a first air equivalent thickness;
   a second prism having a second air equivalent thickness and attached to the first prism;
   a third prism having a third air equivalent thickness and attached to the second prism; wherein the second prism is offset a predetermined distance from a nominal position with respect to the first prism to correct for an air equivalent thickness difference between the first and second prisms in the nominal position such that the air equivalent thicknesses for light selected by each of the first, second, and third prisms are substantially equal.

2. The color separation device of claim 1, wherein the first and second prisms are triangular and the third prism is rectangular.

3. The color separation device of claim 1, wherein the third prism is offset a predetermined distance from a nominal position with respect to the second prism to correct for an air equivalent thickness difference between the first and third prisms such that the air equivalent thicknesses for light selected by each of the first, second, and third prisms are substantially equal.

4. The color separation device of claim 1, wherein the first, second, and third prisms are composed of a plastic material.

5. The color separation device of claim 1, further comprising an air gap formed at the interface of the first and second prisms.

6. The color separation device of claim 1, further comprising a first dichroic coating on an exit facet of the first prism and a second dichroic coating on an exit facet of the second prism.

7. A method for assembling a color separation device, comprising the steps of:
measuring the physical dimensions of a first prism;
measuring the physical dimensions of a second prism;
determining an air equivalent thickness difference between the first and second prisms at a nominal position;
determining a first physical offset distance to correct for the air equivalent thickness difference between the first and second prisms at the nominal position;
attaching the first prism to the second prism at interfacing sides such that the first and second prisms are displaced from the nominal position at their interfacing sides by the first physical offset distance;
determining an air equivalent thickness difference between the first and third prisms;
determining a second physical offset distance to correct for the air equivalent thickness difference between the first and third prisms; and
attaching the third prism to the second prism at interfacing sides such that the second and third prisms are displaced at their interfacing sides by the second physical offset distance.

8. The method of claim 7, wherein the first and second prisms are triangular and the third prism is rectangular.

9. The method of claim 7, wherein the first, second, and third prisms are composed of a plastic material.

10. The method of claim 7, wherein the first prism is attached to the second prism such that an air gap is formed between the interfacing sides of the first and second prisms.

11. The method of claim 7, further comprising the steps of forming a first dichroic coating on an exit facet of the first prism, and forming a second dichroic coating on an exit facet of the second prism.

12. An optical imaging display system, comprising:
one or more image modulating devices;
one or more image projection lenses; and
a color separation prism assembly in optical communication with the image modulating devices and lenses, the prism assembly comprising:
a first prism having a first air equivalent thickness;
a second prism having a second air equivalent thickness and attached to the first prism; and
a third prism having a third air equivalent thickness and attached to the second prism;
wherein the second prism is offset from the first prism such that the air equivalent thicknesses for light selected by each of the first, second, and third prisms are substantially equal.

13. The display system of claim 12, wherein the first and second prisms are triangular and the third prism is rectangular.

14. The display of claim 12, wherein the third prism is offset from the second prism such that the air equivalent thicknesses for light selected by each of the first, second, and third prisms are substantially equal.

15. The display system of claim 12, wherein each of the first, second, and third prisms are in optical communication with a corresponding image modulation device.

16. The display system of claim 15, wherein each image modulation device is attached to an exit facet of each of the first, second, and third prisms.

17. The display system of claim 15, further comprising a field lens attached to an exit facet of each of the first, second, and third prisms.

18. The display system of claim 17, wherein each image modulation device is attached to the field lens on each of the first, second, and third prisms.

19. An optical imaging display system, comprising:
one or more image modulating devices;
one or more image projection lenses;
a color separation prism assembly in optical communication with the image modulating devices and lenses, the prism assembly comprising:
a first prism having a first air equivalent thickness;
a second prism having a second air equivalent thickness and attached to the first prism; and
a third prism having a third air equivalent thickness and attached to the second prism;
wherein the first, second, and third prisms are assembled to provide a predetermined chromatic aberration which compensates for a chromatic aberration caused by one or more optical components in the display system.

20. The display system of claim 19, wherein the first and second prisms are triangular and the third prism is rectangular.

21. The display system of claim 19, wherein at least two of the first, second, or third prisms are directly bonded together with a substantially uniform optical adhesive layer therebetween, the optical adhesive comprising a transparent filler material whereby the physical dimensions of the transparent filler material control the thickness of the optical adhesive layer.

22. The display system of claim 21, wherein the transparent filler material is selected from the group consisting of glass micro-spheres, plastic micro-spheres, glass rods, and glass fibers.

23. The display system of claim 19, wherein each of the first, second, and third prisms are in optical communication with a corresponding image modulation device.

24. The display system of claim 23, wherein each image modulation device is attached to an exit facet of each of the first, second, and third prisms.

25. The display system of claim 24, wherein at least one image modulation device is directly bonded with a substantially uniform optical adhesive layer to the exit facet of the corresponding prism.

26. The display system of claim 24, wherein at least one image modulation device is bonded to an exit facet of the corresponding prism element with an air gap between the image modulation device and the exit facet, the air gap controlled by at least one fixed physical spacer connecting a perimeter region of the image modulation device and a perimeter region of the exit facet.

27. The display system of claim 26, further comprising at least one antireflection coating on either the exit facet or on the image modulation device.

28. The display system of claim 23, further comprising a field lens attached to an exit facet of each of the first, second, and third prisms.

29. The display system of claim 28, wherein each image modulation device is attached to the field lens on each of the first, second, and third prisms.

30. The display system of claim 23, further comprising at least one field lens having a first surface opposite an exit facet of at least one of the prisms and a second surface opposite the corresponding image modulation device with an air gap formed therebetween, wherein the thickness of the air gap is controlled by at least one fixed physical spacer connecting a perimeter region of the image modulation device and a perimeter region of the second surface of the field lens.

31. The display system of claim 30, further comprising at least one antireflection coating on either the second surface of the field lens or on the image modulation device.

32. A color separation device comprising:
- a first prism having a first air equivalent thickness, the first prism having a first dichroic coating on an exit facet thereof;
- a second prism having a second air equivalent thickness and attached to the first prism, the second prism having a second dichroic coating on an exit facet thereof;
- a third prism having a third air equivalent thickness and attached to the second prism; wherein the second prism is offset from the first prism such that the air equivalent thicknesses for light selected by each of the first, second, and third prisms are substantially equal.

33. The color separation device of claim 32, wherein the first and second prisms are triangular and the third prism is rectangular.

34. The color separation device of claim 32, wherein the third prism is offset from the second prism such that the air equivalent thicknesses for light selected by each of the first, second, and third prisms are substantially equal.

35. A method for assembling a color separation device, comprising the steps of:

- forming a first dichroic coating on an exit facet of a first prism;
- forming a second dichroic coating on an exit facet of a second prism;
- measuring the physical dimensions of the first prism;
- measuring the physical dimensions of the second prism;
- determining an air equivalent thickness difference between the first and second prisms;
- determining a first physical offset distance to correct for the air equivalent thickness difference between the first and second prisms;
- attaching the first prism to the second prism at interfacing sides such that the first and second prisms are displaced at their interfacing sides by the first physical offset distance;
- determining an air equivalent thickness difference between the first and third prisms;
- determining a second physical offset distance to correct for the air equivalent thickness difference between the first and third prisms; and
- attaching the third prism to the second prism at interfacing sides such that the second and third prisms are displaced at their interfacing sides by the second physical offset distance.

* * * * *

UNITED STATES PATENT AND TRADEMARK OFFICE
CERTIFICATE OF CORRECTION

PATENT NO. : 6,144,498
DATED : November 7, 2000
INVENTOR(S) : Brett J. Bryars; Blain J. Hendrix It is certified that error appears in the above-identified patent and that said Letters Patent is hereby corrected as shown below:

Column 5,
Line 56, after "10" insert -- , --

Column 10,
Line 13, after "(20" change "micron" to -- microns --
Line 36, after "viscosity" insert -- so --

Column 13, Table 1,
Line 4, change "aplimization" to -- optimzation --

Column 14, Table 1,
Line 33, change "=E22*PIO/180" to -- =E33*PIO/180 --
Line 35, change "28.267" to -- 38.267 --
Line 38, change "=H37*SIN(H35)/SIN(PIO-F35-H26)" to
-- =H37*SIN(F35)/SIN(PIO-F35-H26) --
Line 48, change "-I15" to -- =I15 --

Column 15, Table 1,
Line 64, change "=E65*PIO/180" to -- "=E64*PIO/180 --
Line 71, change "-I15" to -- =I15 --

Column 21, Table 4,
Under "Prism 2" heading on left after "Side 2   75": change second "75" to -- 80 --
(PTO)

Signed and Sealed this

Fourth Day of December, 2001

*Attest:*

*Attesting Officer*

NICHOLAS P. GODICI
*Acting Director of the United States Patent and Trademark Office*